US004001654B2

United States Statutory Invention Registration [19]

[11] Reg. Number: H1654

Rounds

[45] Published: Jun. 3, 1997

[54] TRANSFER MOLDING PROCESS FOR ENCAPSULATING SEMICONDUCTOR DEVICES

[76] Inventor: Nicholas A. Rounds, 271 N. Tamemend Ave., New Britain, Pa. 18901

[21] Appl. No.: 370,597

[22] Filed: Jan. 10, 1995

[51] Int. Cl.[6] ..... B29C 47/02

[52] U.S. Cl. ..... 264/511; 264/272.11; 264/272.17; 264/316; 264/338

[58] Field of Search ..... 264/511, 269, 264/272.11, 272.17, 316, 338; 425/116, 129.1, 544, 546, 588

[56] References Cited

U.S. PATENT DOCUMENTS

| | | | |
|---|---|---|---|
| 4,442,056 | 4/1984 | Slepcevic | 264/272.17 |
| 4,900,501 | 2/1990 | Saeki et al. | 264/272.17 |
| 4,956,141 | 9/1990 | Allen et al. | 264/316 |
| 4,965,037 | 10/1990 | Weaver et al. | 264/511 |
| 4,983,110 | 1/1991 | Yoshida et al. | 425/116 |
| 5,052,907 | 10/1991 | Matumoto et al. | 425/588 |
| 5,098,626 | 3/1992 | Pas | 264/151 |
| 5,164,144 | 11/1992 | Rose | 264/511 |
| 5,226,997 | 7/1993 | Vallier | 264/269 |
| 5,302,101 | 4/1994 | Nishimura | 425/129.1 |
| 5,350,553 | 9/1994 | Glaser et al. | 264/272.17 |
| 5,401,457 | 3/1995 | Valyi | 264/511 |

OTHER PUBLICATIONS

Semiconductor Packaging Update, 1994, vol. 9, No. 6 (ISSN: 0889-9193).

*Primary Examiner*—Charles T. Jordan
*Assistant Examiner*—John R. Hardee

[57] ABSTRACT

The present invention relates to an improved transfer molding method for encapsulating semiconductor, electrical and optical devices with epoxy or other thermoset resins wherein liner film is provided over the surfaces of the package cavities, runners, and pot prior to inserting the preform tablet in the pot and the devices in the package cavities.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

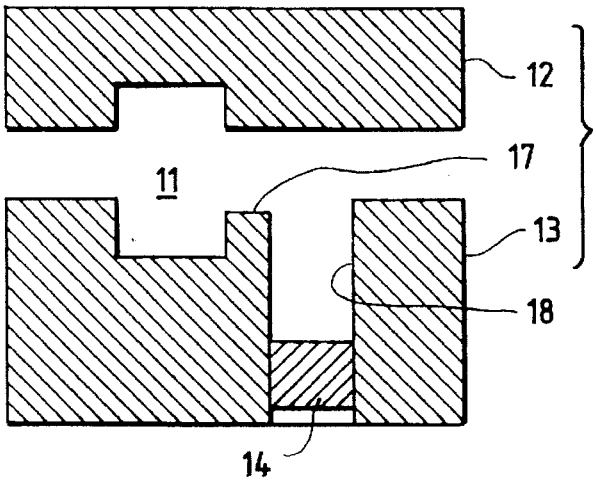
FIG. 1
PRIOR ART
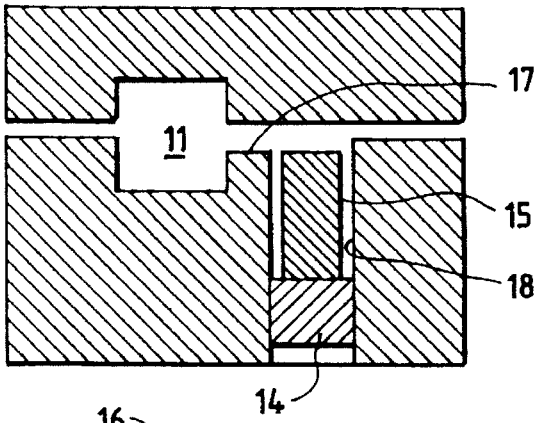
FIG. 2
PRIOR ART
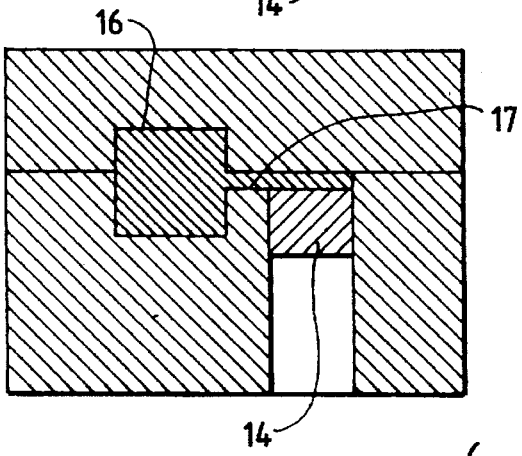
FIG. 3
PRIOR ART
FIG. 4
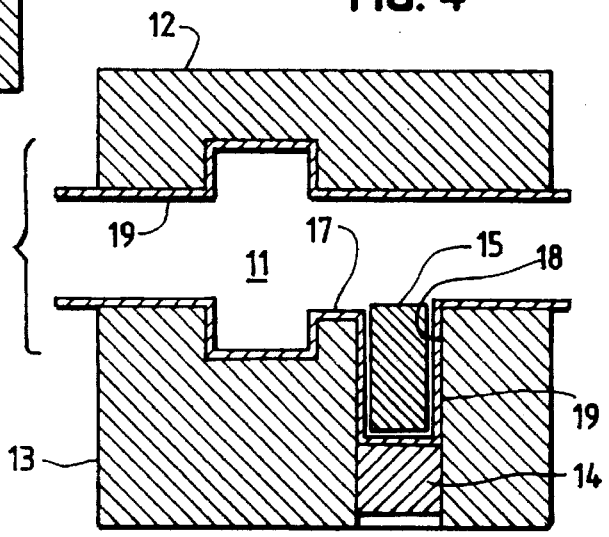

TRANSFER MOLDING PROCESS FOR ENCAPSULATING SEMICONDUCTOR DEVICES

BACKGROUND OF THE INVENTION

1. Field of the Invention

This invention relates to transfer molding methods used to encapsulate semiconductor, electrical and optical devices ("device") with epoxy or other thermoset resin formulations ("formulation").

2. Description of the Prior Art

Transfer molding involves inserting a preform tablet of formulation in a pot, heating the preform, either prior to or after inserting the tablet in the pot, to soften the formulation, using a plunger to transfer the softened formulation from the pot into device cavities in metal molds. The plunger is used to force the soft encapsulating composition along runners into a package cavity in which the device has previously been inserted. The molten formulation surrounds the device in each cavity and encapsulates it.

The formulation which constitutes the preform tablets comprises abrasive fillers and mold release agents which cause problems insofar as the metal molds are subjected to wear and to "staining."

A method is described in Semiconductor Packaging Update, 1994, Vol. 9, No. 6 (ISSN: 0889–9193) in which a special pencil-shaped, film wrapped preform, prepared according to Pas, U.S. Pat. No. 5,098,626, is employed, along with specialized molds which eliminate the conventional pots and runners. Film is drawn into the cavities by vacuum molding. That method has disadvantages in that it requires special preforms, and extensive, complex, and expensive retooling of the molding equipment.

SUMMARY OF THE INVENTION

This invention provides an improved transfer molding method wherein liner film is provided over the surfaces of the package cavities, runners, and pot prior to inserting the preform tablet in the pot and the devices in the package cavities.

DESCRIPTION OF THE DRAWINGS

FIG. 1 shows a vertical cross-section of an open transfer mold having a top portion and a bottom portion, in open position.

FIG. 2 shows a vertical cross-section of the transfer mold in closed position with the preform tablet inserted and the a device inserted in a package cavity, according to conventional practice.

FIG. 3 shows a vertical cross-section of an closed transfer mold after transfer of the formulation from the pot to the cavity, forming an encapsulated device.

FIG.4 shows a vertical cross section of an open transfer mold with the surfaces having been covered by liner film prior to insertion of the preform tablet, and prior to closing the mold.

DETAILED DESCRIPTION OF THE INVENTION AND THE PREFERRED EMBODIMENTS

Figure 5:
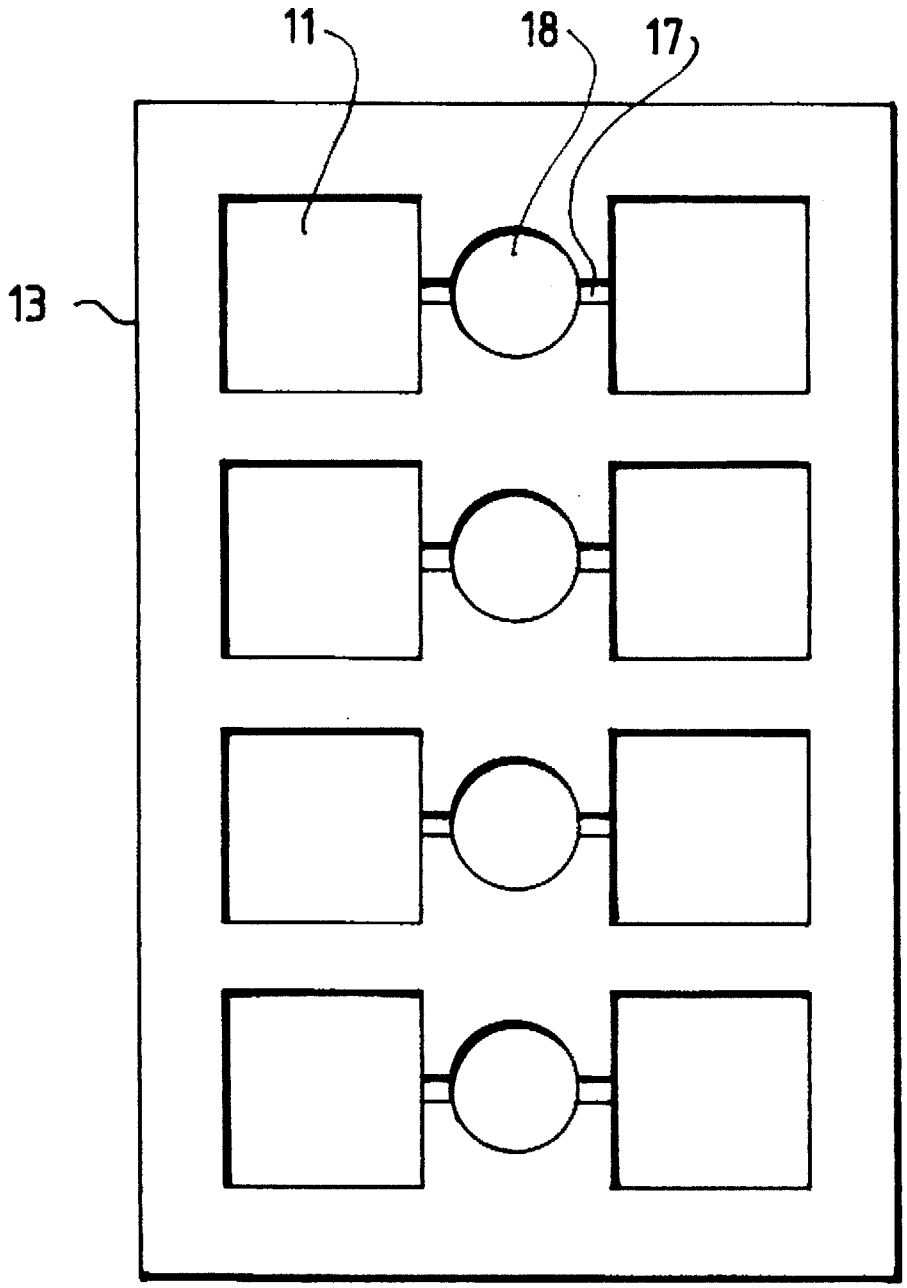
FIG. 5 shows a top schematic view of a bottom portion of a gang-pot mold.

Referring to the drawings, FIGS. 1, 2, and 3 represent a conventional transfer molding method of encapsulating devices which utilizes apparatus which comprises a mold having a top portion 11 and a bottom portion 13, either of said portions including at least one pot 18 and a plunger 14 in each said pot 18, package cavities 11, and runners 17 connecting said package cavities 11 with said pot 18, each of said pots 18, plungers 14, package cavities 11, and runners 17 having surfaces. A device (not shown)is inserted in each of said package cavities 11, a preform tablet 15 of encapsulating composition is inserted in each said pot 18, and wherein said encapsulating composition becomes soft and said plunger 14 is used to force the soft encapsulating composition along said runners 17 and into said package cavities 11, to encapsulate the device 16. In an alternative embodiment of the apparatus, the pot can be in the top portion of the mold. According to this invention, liner film 19 (FIG. 4, representing the invention)is provided over the entire resin transfer portion of the mold, including the pot 18, (including the tops of the plungers 14 in tile pots 18) runners 17 and device cavities 11, before the resin preform tablets 15 and the electrical devices (not shown) are placed in position. When the open mold illustrated in FIG. 4 is closed, as shown in FIG. 3 during tile normal transfer of the resin formulation from the pot to the cavities according to this invention, none of the formulation ever contacts the mold surfaces because of the liner film 19. Tile liner film 19 thus protects the mold and allows more formulation latitude in the encapsulating resin since release of the resin from metal surfaces is avoided. Usually separate liner film is provided for each of the top and bottom portions of the mold.

Any suitable plastic or rubber film which can withstand a molding temperature of about 175° C. and the abrasiveness of the formulation being used is suitable. One application of liner film can be used for multiple transfers until it either wears out or builds up an unacceptable level of resin stains or deposits. Alternatively, new liner film can be applied to parts or all of the mold before each transfer.

Any preform tablet used in this art is suitable. Preferred preform tablets have high density, preferably above 90%, and low water content, preferably below 0.1%, but preform tablets having other densities and water contents can also be used.

The film can be applied to the surfaces by any method, e.g., by vacuum forming the film liner across all of the surfaces (not shown). Contrary to the method of Pas which employs prewrapped pencils of formulation, according to the present invention conventional unwrapped preform tablets are highly preferred. Typical gang-pot molds (FIG. 5) are preferably used.

Advantages of this invention are that the mold surfaces are protected, allowing longer mold life and/or use of less precise and less expensive molds; the formulation can be made without mold release agents because the film itself acts as a mold releaser; there is less leakage ("flash" or "bleed") of formulation beyond desired areas, which has been a concern in this art; less mold clean up work is needed since the process results in clean molds; no particulate scrap from cured molding compound and thus no contamination of the apparatus.

One preferred method is to use a reel-to-reel supply (not shown). Optionally the lining film can serve as a shipping envelope for the molded devices. Using this process, the devices can be delivered to the assembly station in a continuous spooled container which can be loaded into automated assembly tooling.

What is claimed is:

1. In a transfer molding method of encapsulating devices which utilizes apparatus which comprises a mold, said mold having a top portion and a bottom portion, either of said portions including at least one pot and a plunger in each said pot, package cavities, and runners connecting said package cavities with said pot, each of said pots, plungers, package cavities, and runners having surfaces, wherein a device is inserted in each of said package cavities, a preform tablet of encapsulating composition is inserted in each said pot, and wherein said encapsulating composition becomes soft and said plunger is used to force the soft encapsulating composition along said runners and into said package cavities;

the improvement comprising using a preform tablet of encapsulating composition having a density Of at least 90% and a water content of 0.1% or less, providing a liner film over the surfaces of said package cavity, runners, and pot prior to inserting said preform tablet in said pot and said device in said package cavity, wherein said liner film is provided for each of said top and bottom portions so as to line all surfaces which come into contact with said soft encapsulating composition, and wherein vacuum is applied to form the liner film to all resin transfer surfaces of the top and bottom portions.

2. Method according to claim 1 wherein a gang-pot mold configuration is used.

3. Method according to claim 1 wherein the liner film is used for one molding cycle and then is replaced with new liner film for each subsequent molding cycle.

4. Method according to claim 1 wherein an application of liner film is used for two or more mold cycles.

5. Method according to claim 1 wherein the liner film is not separated from the molded parts, and is used as a wrap to store or ship said parts.

6. Method according to claim 1 wherein the preform tablets are not pre-wrapped in film.

7. Method according to claim 6 wherein said preform tablets are cylindrically shaped.

* * * * *